United States Patent [19]
Carroll

[11] 3,804,088
[45] Apr. 16, 1974

[54] REMOVABLE IMPLANTATE FOR ADMINISTERING PHYSIOLOGICAL ACTIVE AGENTS TO ANIMALS

[75] Inventor: Lamar H. Carroll, Carmel, Ind.

[73] Assignee: Eli Lilly and Company, Indianapolis, Ind.

[22] Filed: July 31, 1972

[21] Appl. No.: 276,545

[52] U.S. Cl. .............................................. 128/260
[51] Int. Cl. ........................ A61m 7/00, A61j 1/00
[58] Field of Search .......... 128/260, 232, 269, 271, 128/272; 3/1

[56] References Cited
UNITED STATES PATENTS

| | | | |
|---|---|---|---|
| 3,102,540 | 9/1963 | Bentov | 128/260 X |
| 2,625,158 | 1/1953 | Lee et al. | 128/260 |
| 3,279,996 | 10/1966 | Long, Jr. et al. | 128/272 X |
| 1,857,145 | 5/1932 | Funk | 128/269 |
| 2,510,490 | 6/1950 | Ager | 128/269 |
| 2,546,759 | 3/1951 | Lee et al. | 128/260 |
| 3,699,956 | 10/1972 | Kitrilakis | 128/260 |

Primary Examiner—Aldrich F. Medbery
Attorney, Agent, or Firm—Ralph W. Ernsberger; Everet F. Smith

[57] ABSTRACT

Removable implantate for inserting beneath the skin of an animal; said implantate comprising a medicated member in combination with a medicated member holder which can be readily removed from beneath the animal's skin at any time.

7 Claims, 4 Drawing Figures

3,804,088

REMOVABLE IMPLANTATE FOR ADMINISTERING PHYSIOLOGICAL ACTIVE AGENTS TO ANIMALS

BACKGROUND OF THE INVENTION

1. Field of the Invention

This invention relates to an implantate which can be inserted beneath the skin of an animal and subsequently removed at any time, said implantate being a medicated member for releasing a physiologically active agent into the tissues of a living organism in combination with a medicated member holder. More particularly, the instant invention relates to a medicated member holder which in combination with a medicated member, such as is described in U.S. Pat. No. 3,279,996, or in Modern Plastics, 49, 4,75 (1972), comprises an implantate for administering physiologically active agents to animals which can be readily removed at any time.

2. Description of the Prior Art

The administration of physiologically active agents to animals by implanting a medicated member beneath the animal's skin is old in the art. It was learned years ago that implanting a pellet containing diethylstilbestrol beneath the skin of a young chicken effectively chemically castrated the male birds and resulted in a meatier more tender carcass. More recently, pellets of diethylstilbestrol have been implanted beneath the skin of cattle and sheep to improve weight gains and feed efficiency. Other physiologically active agents, such as steroid and antibiotics have been administered to animals in this manner.

The efficacy of the implant route of administration has been proved. However, an implant continues to pay out over a long period of time, and in many instances the physiologically active agent is not exhuasted when the animal is slaughtered for meat. Consequently, there have been instances when residues of the physiologically active agent so administered have been present in the meat consumed by people. This is an undesirable condition and many attempts have been made to develop a medicated implantate that is effective, but which will not result in residues of the physiologically active agent in the tissues of animals slaughtered after having been administered the implantate.

Efforts have been made to overcome this problem by surgically removing the implantate prior to slaughter. This procedure is slow, difficult, expensive and unreliable, as the implantate may have moved from the original position of implantation.

Attempts have been made to provide an implantate which can be removed at an appropriate time before marketing to assure the absence of tissue residues of the physiologically active agent. One such implantate has the disadvantage that an animal can rub the implantate out from beneath the skin by brushing against a tree, fence post, building, or the like. Another implantate must be anchored by tieing or clipping the two ends together outside the animal's skin after implanting the medical member beneath said skin. This latter implantate is costly to position because of the added operation of bringing the two ends together and either tying or clipping.

Accordingly it is an object of this invention to provide a medicated member holder, adapted for receiving and holding a medicated member, which can be employed for inserting and positioning said medicated member beneath the skin of an animal and for removing said medicated member at any desired time.

Another object of this invention is to provide an implantate which can be inserted beneath the skin of an animal to administer a physiologically active agent thereto and which can easily be removed from beneath said skin at any time.

Another object of this invention is to provide an implantate for administering a physiologically active agent to an animal which can not be easily dislodged by the animal in rubbing against stationary objects.

A further object of this invention is to provide a removable implantate which can be anchored in place beneath the skin of an animal by a single insertion operation.

SUMMARY

It has now been discovered that a removable implantate which can be quickly and efficiently inserted, and conveniently and reliably removed from beneath the skin of an animal is comprised of: (a) A linear member having a first and second end and to which is attached, between said ends, a medicated member for releasing a physiologically active agent into the tissues of a living organism. (b) A first restraining member transversely connected to the first end of said linear member, said restraining member having a length greater than the transverse dimension of said medicated member attached to said linear member. And (c) A second restraining member transversely connected to the second end of said linear member, said restraining member having a length greater than the transverse dimension of said medicated member attached to said linear member.

DESCRIPTION OF THE PREFERRED EMBODIMENTS

In the following detailed description of the embodiments of this invention, reference is made to the accompanying drawing.

The novel removable implantate of this invention comprises: (a) a medicated member holder adapted for receiving and holding a medicated member for releasing a physiologically active agent into the tissues of a living organism when said medicated member is in contact therewith, and (b) a medicated member attached to said medicated member holder.

The medicated member holder of the instant invention comprises: (a) A linear member, having a first and a second end, adapted for the attachment between the ends thereof, of a medicated member for releasing a physiologically active agent into the tissues of a living organism when said medicated member is in contact therewith. (b) A first restraining member transversely connected to said first end of said linear member. And (c) a second restraining member transversely connected to said second end of said linear member.

The useful medicated member holder and the implantate, of which is a part, are described more fully hereinafter.

The novel removable implantate of this invention comprises: (a) a linear member, preferably of plastic, to which is attached, between the ends thereof, a medicated member for releasing a physiologically active agent into the tissues of a living organism, (b) a first restraining member transversely connected to one end of said linear member, and (c) a second restraining member transversely connected to the opposite end of said linear member.

The useful removable implantate of the instant invention is described more fully hereinafter.

Figure 1:
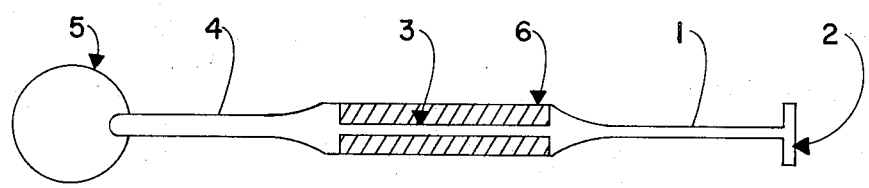
FIG. 1 is a plan view of one embodiment of a removable implantate.

In a preferred embodiment, illustrated in FIG. 1 with a medicated member 6 fitted thereto, a sub-assembly comprising a removable medicated member holder of a removable implantate constitutes one aspect of this invention. In this sub-assembly, the linear member is comprised of three elements, 1, 3 and 4. A first cone-like element 1 has an elongated and truncated tip. A first restraining member 2 is transversely connected to said truncated tip. Said restraining member 2 has a cross-sectional area approximately the same as said truncated tip to which it is connected, and has a length greater than the diameter of the base of said cone-like element 1, preferably said length is about twice said diameter. Axially connected to the center of the base of said cone-like element 1 is one end of a filament 3. The cross-sectional area of said filament 3 is about the same as the cross-sectional area of the truncated tip of said cone-like element 1. Said filament 3 can have any lateral configuration from a rectangle to a circle, preferably the cross-sectional area is round.

A second cone-like element 4, having a base diameter essentially the same as said cone-like element 1, and an elongated and truncated tip is axially connected at the center of its base to the opposite end of said filament 3. Said first and second cone-like elements 1 and 4 are coaxially aligned base to base, and connected by said filament 3. A second restraining member 5 is transversely connected to said truncated tip of said cone-like element 4. Said second restraining member 5 is preferably in the shape of a button that is perimetrically connected to said truncated tip and has an axis transverse to said tip that is greater in length than the base of said cone-like element 4, preferable said length is about twice said diameter.

It is preferred that the medicated member holder illustrated in FIG. 1, and described above, be molded in one piece from a semi-rigid plastic such as, for example, polyethylene, polypropylene, polysiloxane, acrylic-butadienestyrene co-polymer, nylon, polyester, polyfluorinated hydrocarbons, and the like. The opposing cone-like elements can be, alternatively, structures with bases having a plurality of sides with inclined planes sloping away from said bases to a truncated tip. Consequently, elements 1 and 4 can have bases that are triangular, rectangular, hexagonal, ovoid, or the like. It is beneficial in the insertion and removal of the implantate that the sides of said cone-like elements slope away from the respective bases to the truncated tips.

The restraining member 2, can be connected at right angles to said first cone-like element, as shown in FIG. 1, or, alternatively, the angles of attachment can be either acute or obtuse. For example, said restraining member 2 can be attached to resemble an arrow-head, in which case the attachment angles are acute, or there can be a resemblance to the feathers on an arrow, in which case the attachment angles are obtuse.

The second restraining member 5 can be shaped in the form of a circle, or button, as shown in FIG. 1, or, alternatively, it can be rectangular, or any other geometric form between a rectangle and a circle, such as an ovoid, or the like. It is preferred that said member 5 should have sufficient surface to imprint an identification code for the medicated member affixed to said holder. Alternatively, said restraining member 5 can be color coded for ready identification at a distance without close inspection. Moreover, serial codes can be imprinted on said member 5 that can provide positive control of the removal of all implantates from a group of animals.

The medicated member 6 is shown in FIG. 1 affixed to said holder between the opposing bases of said first and second cone-like elements 1 and 4, and surrounding said filament 3. Said medicated member 6 and said medicated member holder are mated so that the longitudinal length of said medicated member 6 is essentially the same as the length of said filament 3, and the outside diameter of said medicated member 6 is essentially the same as the base diameter of said first and second cone-like elements 1 and 4.

In an especially preferred embodiment of this invention a removable implantate for releasing physiologically active agents into the tissues of a living organism comprises: (a) a linear member adapted for receiving and holding a medicated member; (b) a first restraining member transversely connected to one end of said linear member, (c) a second restraining member transversely connected to the opposite end of said linear member, and (d) a medicated member for releasing a physiologically active agent into the tissues of a living organism affixed to said linear member at a point between the ends thereof.

In this second embodiment of the instant invention said linear member with said first and second restraining members connected thereto comprises the novel medicated member holder described in detail hereinbefore. Preferably said second restraining member is in the shape of a button perimetrically connected to said linear member. The removable implantate of this embodiment combines said medical member holder and said medicated member.

The medicated member 6 is constituted of a flexible substance such as a silicone rubber, acrylate or methacrylate polymer which is insoluble in tissue fluids and the physiologically active agent to be released into said tissue fluids. Said medicated member 6 can be molded separately to the desired dimensions for mating with said medicated member holder; with a chamber disposed longitudinally in the center of said medicated member 6 conforming to, and slightly larger than, the cross-sectional area of said filament 3, and a longitudinal slit extending the length of, and penetrating from the outside surface to the chamber in said medicated member 6. Such a construction permits said medicated member 6 to be slipped over said filament 3 between the opposing bases of the first and second cone-like elements 1 and 4. Alternatively, said medicated member 6 can be molded onto said removable implant holder between said bases and around said filament 3. In any case said medicated member 6 has an outside diameter substantially the same as the base diameter of said first and second cone-like elements 1 and 4.

The useful implantate of this second embodiment comprising the novel implant holder of the first embodiment combined with the medicated member described hereinbefore provides a means for inserting and anchoring said medicated member beneath the skin of an animal. After having reposed under the skin for a predetermined period while the physiologically active agent is being released, the implantate can be readily removed by grasping the second restraining member 5 and pulling the removable implant holder to which the medicated member is affixed, from its position under the animal's skin. Thusly, the withdrawal of the implantate assures the complete removal of the physiologically active agent at a specified time before marketing, thereby eliminating any possibility of residues in the meat.

In a preferred method of utilizing the novel removable implantate of this invention, a specially designed needle is inserted through two folds of an animal's skin; the first restraining member 2 is engaged with said needle and the needle withdrawn pulling the medicated member beneath the skin. The second restraining member 5 prevents the pulling through of the entire implantate and the first restraining member 2 prevents the implantate from being dislodged from its position. At the aporopriate time for removal, the first restraining member 2 is severed from the implantate, the second restraining member 5 grasped firmly and the removable implantate withdrawn from the animal.

Alternatively, a specially designed needle can be employed to anchor the first restraining member 2 beneath the skin along with the medicated member 6 of the implantate. When this anchoring procedure is employed the first cone-like element 1 is relatively short in relation to the entire implantate and the elongated truncated tip on the second cone-like element 4 is of a larger cross-sectional area than the similar structure of the first cone-like element 1, providing greater tensile strength for the withdrawal operation. The withdrawal of the medicated member holder with the medicated element affixed thereto is accomplished as described above, albeit a greater pull is required to overcome the impeding effect of the first restraining element 2 as the holder is withdrawn.

Figure 2:
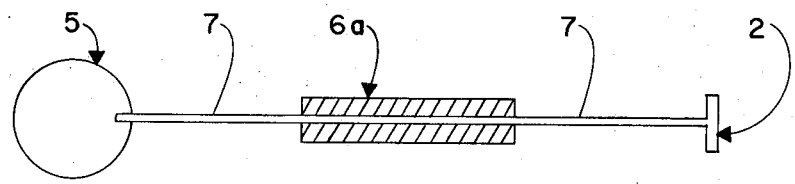
FIG. 2 is a plan view of one embodiment of a removable implantate

Another embodiment of the instant invention is illustrated in FIG. 2. This third embodiment comprises a thin semi-rigid filament of an essentially uniform cross-sectional area having a first and a second end. A medicated member 6a is affixed at a point between said first and second ends of said filament 7. The first end of said filament 7 is connected to a first restraining member 2, and the second end of said filament 7 is connected to a second restraining member 5. Said first restraininng member 2 and said second restraining member 5 are each, respectively of a structure and configuration, and meet the same criteria as described hereinbefore for the preferred embodiment.

Preferably, said filament 7, said first restraining member 2 and said second restraining member 5 are a one-piece molding of a plastic material such as one of the plastics denoted hereinbefore. The medicated member 6a comprising a physiologically active agent in combination with a physiologically active agent carrier, such as silicone rubber, an acrylate or methacrylate polymer, or the like, capable of releasing said active agent at a constant rate into the tissues of a living organism is attached to said filament 7 as a point between said first and second ends of said filament 7.

A preferred mode of attachment of said medicated member 6a to said filament 7 is to mold said member 6a around said filament 7. When this manner of attachment is utilized, said medicated member 6a should have an outside diameter of about one-half the length of said first restraining element 2 and said second restraining element 5.

To facilitate the attachment of the medicated member 6a to the filament 7 when said medicated member has a low coefficeint of adhesion with the plastic material of which said filament is constructed, spurs of various configurations can be integrally molded in said filament at the position where said medicated member is to be molded thereto.

The removable implantate of the above described embodiment is utilized in the same manner as is outlined in detail hereinbefore in connection with the second preferred embodiment of this invention.

Figure 3:
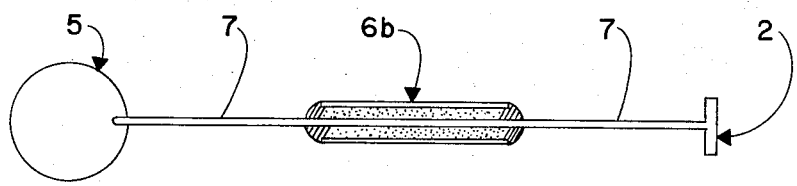
FIG. 3 is a plan view of one embodiment of a removable implantate

In yet another embodiment of the instant invention, as illustrated in FIG. 3, a removable implantate for releasing a physiologically active agent into the tissues of a living organism is comprised of: (a) a section of silicone rubber tubing, in which the described physiologically active agent is soluble, disposed on a filament 7 between a first restraining element 2 and a second restraining element 5, (b) a physiologically active agent which is soluble in said silicone rubber disposed in said tubing, and (c) a silicone rubber composition sealing both ends of said silicone rubber tubing and cementing said silicone rubber tubing to said filament 7.

This embodiment which is the fourth of the instant invention utilizes the same medicated member holder as that described hereinbefore in the connection with the third embodiment hereof. The manner in which the medicated member 6b is constructed and attached to said holder distinguishes the fourth from the third embodiment.

The medicated member 6b of this fourth embodiment is combined with said holder by disposing a section of silicone rubber tubing having an outside diameter about one-half the transverse dimension of said restraining members 2 and 5 of said implantate. The tubing is slipped over the semi-rigid first restraining member 2 as the latter is momentarily distorted to allow the tubing to be moved into position. Then one end of said tubing is closed and simultaneously sealed to said filament 7 with a silicone rubber composition which vulcanizes at room temperature. A pre-determined amount of the desired physiologically active agent, which is soluble in said silicone rubber is filled into said tubing in the space between the outside dimension of said filament 7 and the inside dimension of said tubing. Then the unsealed end of said silicone rubber tubing is closed and sealed to said filament 7 with a silicone rubber composition which vulcanizes at room temperature.

The removable implantate of this forth embodiment is utilized in the same manner as is described hereinbefore in connection with the second preferred embodimnet of this invention.

Figure 4:
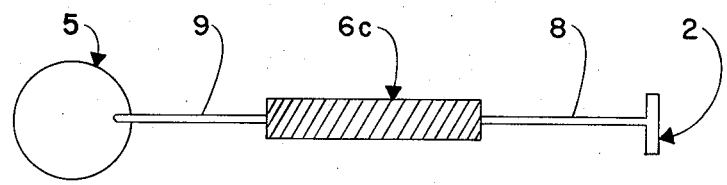
FIG. 4 is a plan view of one embodiment of a removable implantate.

In still another embodiment of this invention, a removable implantate, as illustrated in FIG. 4, is comprised of: (a) a medicated member 6c having a first and second end, (b) a thin filament 8 having a first restraining member 2 transversely connected to one end and axially attached at the opposite end to said medicated member 6c, and (c) a thin filament 9, having a second restraining member 5 transversely connected to one end, axially attached at the opposite end to the second end of said medicated member 6c, and coaxially disposed with said first filament 8.

The medicated member of this fifth embodiment can be a combination of a physiologically active agent and a physiologically active agent carrier such as silicone rubber, an acrylate or methacrylate polymer, or the like, or a section of silicone rubber tubing containing the desired physiologically active agent closed at both ends with a silicone rubber composition which vulcanizes at room temperature. Said first and second filaments 8 and 9 are axially connected respectively to said first and second ends of said medicated element 6c. The connection can be made in the case of said molded combination by sealing said filament ends to opposite ends of said medicated element, or by molding said medicated member onto the respective filament ends. In the latter case a burr on the ends of said filaments aids in cementing the moulding thereto. Where the medicated member comprises a silicone rubber tubing filled with the desired physiologically active agent, one end of each of said first and second filaments, respectively, is sealed to said first and second ends of said tubing with the room temperature vulcanizable silicone rubber composition utilized in closing the respective ends of said tubing.

The first restraining member 2 and the second restraining member 5 connected to said first and second filaments, 8 and 9 respectively are the same as described hereinbefore in connection with the second preferred embodiment of this invention.

The removable implant of this fifth embodiment is utilized in the same manner as is described hereinbefore in connection with the second preferred embodiment of this invention.

The novel removable implantates of the instant invention provide the animal husbandryman with a means for utilizing an implant for administering such physiologically active agents as anthelmintics, antibiotics, steroids, hormones, growth promoting agents, and the like to meat producing animals with a resulting reliable, quick and economic precedure for removing the implantate before the animal goes to market. Thus the animal producer and the consumer can be assured that there will be no physiologically active agent residues in the tissues of animals at the time of slaughter.

What is claimed is:

1. A removable implantate for releasing a physiologically active agent into the tissues of a living organism when said inplantate is in contact therewith comprising:
   a. a thin semi-rigid filament having a first and a second end;
   b. a first cone-like element having an essentially circular base and an elongated and truncated tip to which is connected transversely a first restraining member having a length greater than the base of said element, said element being attached at the center of its base to the first end of said filament;
   c. a second cone-like element having an essentially circular base and an elongated and truncated tip, said element being attached at the center of its base to said second end of said filament, said element having a base diameter essentially the same as said first cone-like element and coaxially disposed base to base therewith; and
   d. a second restraining member transversely connected to said elongated and truncated tip of said second cone-like element, said second restraining member having a dimension transverse to said truncated tip which is greater than the diameter of the base of said element; and
   e. said first and second cone elements being spaced apart a distance adequate to receive a medicated member there-between.

2. An implantate according to claim 1 wherein said medicated member comprises a physiologically active agent in combination with a physiologically active agent carrier capable of releasing said active agent into the tissues of a living organism when said member is in contact therewith.

3. An implantate according to claim 1 wherein said second restraining member is in the shape of a button perimetrically connected to said truncated tip of said second cone-like element.

4. An implantate according to claim 1 wherein said first and second restraining members have a dimension transverse to said first and said second cone-like elements about twice the diameter of the bases of said elements.

5. An implantate according to claim 2 wherein said medicated member comprises a preformed element having means for affixing said element between said bases on said filament.

6. An implantate according to claim 5 wherein said means is a longitudinal slit through one wall of said element.

7. An implantate according to claim 2 wherein said medicated member comprises an element molded between said bases on said filament.

* * * * *